P. C. C. ISHERWOOD.
FILTERING APPARATUS.
APPLICATION FILED FEB. 18, 1910.
1,043,939.
Patented Nov. 12, 1912.
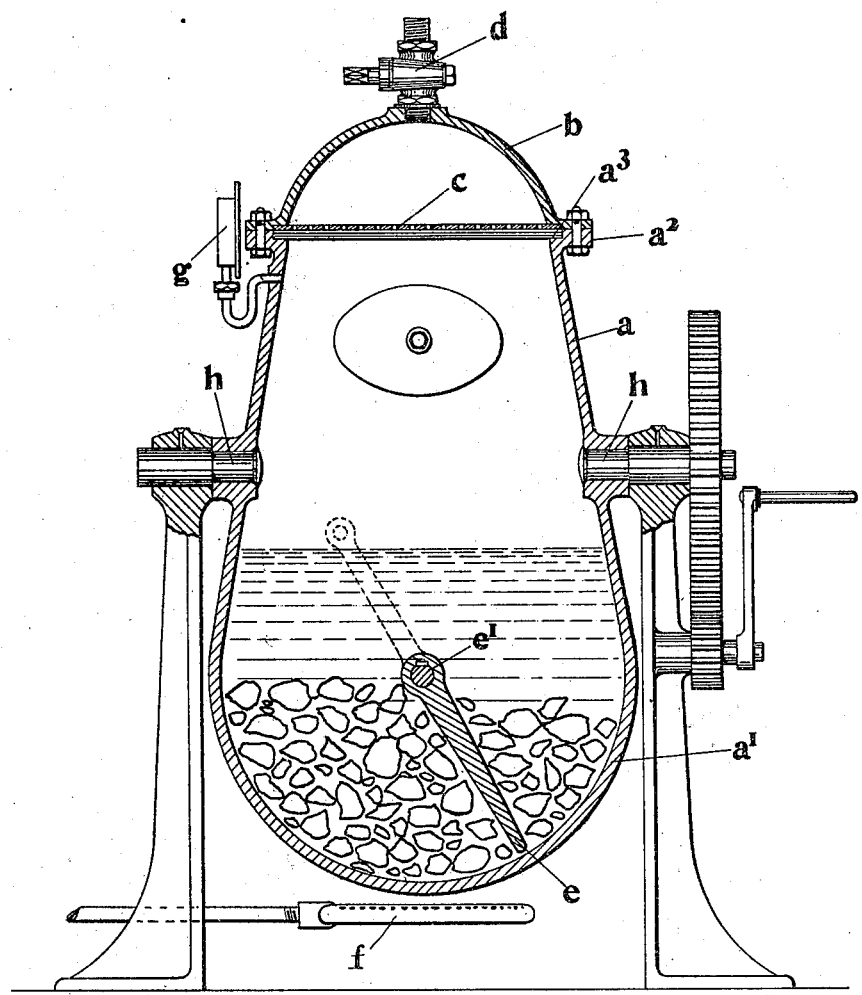
Witnesses—
Stanley Wood
Henry William Blake
Inventor
Percy Claude Cameron Isherwood
by
Attorney.

UNITED STATES PATENT OFFICE.

PERCY CLAUDE CAMERON ISHERWOOD, OF LEYTONSTONE, ENGLAND, ASSIGNOR TO REFRACTORY ZINC ORE TREATMENT COMPANY, A CORPORATION OF NEW YORK.

FILTERING APPARATUS.

1,043,939.

Specification of Letters Patent. Patented Nov. 12, 1912.

Application filed February 18, 1910. Serial No. 544,651.

*To all whom it may concern:*

Be it known that I, PERCY CLAUDE CAMERON ISHERWOOD, Ph. D., chemist, a subject of the King of Great Britain and Ireland, residing at Hazelwood, Forest Glade, Leytonstone, England, have invented certain new and useful Improvements in Filtering Apparatus, of which the following is a specification.

This invention relates to apparatus for filtering and especially for the filtration of solutions of substances such as refractory zinc lead ores which crystallize on reduction of the temperature or pressure under which they have been dissolved.

According to the invention I provide means whereby the filtration shall be quickly effected under heat and under pressure and in such manner that premature crystallization of the dissolved compounds and the choking of the filter are avoided.

According to the invention moreover I provide a vessel capable of being tightly closed by means of a cover plate and I provide the vessel so that in its upright position the extraction or other treatment may take place, and so that it may be turned upside down with the filterplate lowermost, for the purpose of filtering the charge, so that thus the coarser particles of the charge come to lie upon the filter plate.

The invention is illustrated in the accompanying drawing which is a sectional elevation of the filtering pot or vessel.

In carrying the invention into effect in the construction of a filter, I provide a pot or vessel $a$ advantageously having a curved bottom $a^1$ and an open top carrying a surrounding flange $a^2$ upon which a cover plate $b$, advantageously of curved form, may be mounted and be capable of being bolted to the flange $a^2$ of the pot or vessel so that the material may be treated under pressure therein.

The top face of the pot or vessel is advantageously recessed as shown at $a^3$ for the reception of the filter plate $c$ which conveniently may be constituted of a number of layers, that is to say, a layer of wire gauze, a layer of filtering material and a perforated supporting plate, all the layers being advantageously of the same size and extending over the mouth of the pot or vessel and having their edges lying in the recess provided for their reception in which they may be held by the flange of the cover plate which latter has an outlet cock $d$ carried upon it so that when the vessel is turned down the liquor may pass out.

At the lower part of the vessel I advantageously provide a blade or stirrer $e$ mounted upon a spindle $e^1$ which extends outwardly and is capable of rotation so that the charge may be well stirred in order that the extraction may be effective to take in solution all the required soluble constituents. Heat is applied to the bottom of the pot or vessel as shown at $f$, and a pressure gage $g$ provided on the side of the vessel permits of the heating being effected to the necessary determined pressure. After extraction the pot or vessel is turned upon trunnions $h$ that may be provided for the purpose, so that the whole charge is then supported by the filter plate $c$ and on the outlet cock $d$ being opened the solution will be forced through the residue and filterplate by the internal pressure corresponding to the temperature to which the liquor has been previously heated, whereby the filtration is quickly effected.

It will be understood that the invention is not limited to the particular form of the vessel hereinbefore described nor is it confined to any particular means of heating the charge. Any means of heating may be employed such for example as a gas or liquid fuel burner, or the heating may be effected by steam under pressure passed through coils of piping or a jacket surrounding the vessel, or steam already at the requisite pressure may be passed through the charge.

What I claim as my invention and desire to secure by Letters Patent is:—

1. Filtering apparatus comprising a vessel having a curved bottom and open top, filtering means at the upper end of the vessel, a cover of curved form so as to provide a hollow space above the filtering means, stirring means within the lower part of the vessel and means for rotating the vessel.

2. Filtering apparatus comprising a vessel having a curved bottom and open top, the upper end of said vessel being recessed, filtering means at the upper end of the vessel, said filtering means being disposed within the recessed part of the vessel, a curved cover so as to provide a hollow space above the filtering means, and means for rotating the vessel.

3. Filtering apparatus comprising a vessel having a curved bottom and open top, the upper part of the vessel being recessed, filtering means at the upper end of the vessel, said filtering means being disposed within the recessed part of the vessel, stirring means within the lower part of the vessel, a cover of curved form so as to provide a hollow space above the filtering means, and means for rotating the vessel.

In testimony whereof I have hereunto signed my name to this specification in the presence of two subscribing witnesses.

PERCY CLAUDE CAMERON ISHERWOOD.

Witnesses:
LIONEL ERNEST BUSSEY,
H. D. JAMESON.

---

Copies of this patent may be obtained for five cents each, by addressing the "Commissioner of Patents, Washington, D. C."